US009384448B2

(12) United States Patent
Tu et al.

(10) Patent No.: US 9,384,448 B2
(45) Date of Patent: Jul. 5, 2016

(54) ACTION-BASED MODELS TO IDENTIFY LEARNED TASKS

(75) Inventors: Peter Henry Tu, Niskayuna, NY (US); Ting Yu, Albany, NY (US); Dashan Gao, Rexford, NY (US); Thomas Baby Sebastian, Niskayuna, NY (US); Yi Yao, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 442 days.

(21) Appl. No.: 13/339,297

(22) Filed: Dec. 28, 2011

(65) Prior Publication Data

US 2013/0173504 A1 Jul. 4, 2013

(51) Int. Cl.
*G06N 99/00* (2010.01)
*G06K 9/62* (2006.01)

(52) U.S. Cl.
CPC ............ *G06N 99/005* (2013.01); *G06K 9/6256* (2013.01)

(58) Field of Classification Search
CPC .......................... G06N 99/005; G06K 9/6256
USPC ........................................................... 706/12
See application file for complete search history.

(56) References Cited

U.S. PATENT DOCUMENTS

| 6,353,814 B1* | 3/2002 | Weng ................. G05B 13/0265 700/258 |
| 7,636,701 B2* | 12/2009 | Funge et al. .................... 706/47 |
| 2010/0262286 A1* | 10/2010 | Eidenberger et al. ......... 700/246 |

OTHER PUBLICATIONS

Tu et al., Action Recognition from Experience, 2012 IEEE Ninth International Conference on Advanced Video and Signal-Based Surveillance, pp. 124-129, 2012.*
Conde et al., Behavioral Animation of Autonomous Virtual Agents Helped by Reinforcement Learning, IVA 2003, LNAI 2792, pp. 175-180, 2003.*
Tsubone et al., Task Learning Based on Reinforcement Learning in Virtual Environment, ICONIP 2007, Part II, LNCS 4985, pp. 243-253, 2008.*
Merrick et al., Motivated Reinforcement Learning for Non-Player Characters in Persistent Computer Game Worlds, ACE 06, Jun. 14-16, 2006.*
Gavrila, The Visual Analysis of Human Movement: A Survey, Computer Vision and Image Understanding, vol. 73, No. 1, Jan., pp. 82-98, 1999.*
Lee et al., Precomputing Avatar Behavior from Human Motion Data, Elsevier Science Direct: Graphical Models 68, pp. 158-174, 2006.*
Ray et alia. Model-Based Reinforcement Learning. Encyclopedia of Machine Learning, pp. 690-693, 2010.*
Xu, Joseph. Instance Based Model Learning. Soar Workshop 2009.*

(Continued)

*Primary Examiner* — Stanley K Hill
*Assistant Examiner* — Robert H Bejcek, II
(74) *Attorney, Agent, or Firm* — Melissa K. Dobson

(57) ABSTRACT

Systems provided herein include a learning environment and an agent. The learning environment includes an avatar and an object. A state signal corresponding to a state of the learning environment includes a location and orientation of the avatar and the object. The agent is adapted to receive the state signal, to issue an action capable of generating at least one change in the state of the learning environment, to produce a set of observations relevant to a task, to hypothesize a set of action models configured to explain the observations, and to vet the set of action models to identify a learned model for the task.

8 Claims, 7 Drawing Sheets

(56) References Cited

OTHER PUBLICATIONS

Moeslund et al., A Survey of Computer Vision-Based Human Motion Capture, Computer Vision and Image Understanding, vol. 81, pp. 231-268 (2001).*

Jimenez et alia. Integrating Planning, Execution and Learning to Improve Plan Execution. Computational Intelligence, vol. 00, No. 000, 2009.*

Saxena et al. Make3D: Depth Perception from a Single Still Image. Proceeding AAAI'08 Proceedings of the 23rd national conference on Artificial intelligence—vol. 3, pp. 1571-1576 , 2008.*

McCallum. Hidden State and Reinforcement Learning with Instance-Based State Identification. IEEE Transactions on Systems, Man, and Cybernetics-Part B Cybernetics, vol. 26, No. 3, Jun. 1996.*

Agarwal, A., et al.; "Recovering 3D human pose from monocular images"; IEEE Transactions on Pattern Analysis & Machine Intelligence, 28(1), Jan. 2006.

Andriluka, M., et al.; "Pictorial Structures Revisited"; People Detection and Articulated Pose Estimation. In CVPR, pp. 1014-1021, 2010.

Blake, R., et al.; "Perception of human motion"; Annual Review of Psychology, 58(1):47-73, 2007.

Ferrari, V., et al.; "Progressive search space reduction for human pose estimation"; In Proceedings of the IEEE Conference on Computer Vision and Pattern Recognition, Jun. 2008.

Guan, P., et al.; ". Estimating human shape and pose from a single image"; In IEEE International Conference on Computer Vision, 2009.

Kaelbling, L.P., et al.; "Reinforcement learning: A survey"; Journal of Artificial Intelligence Research, 4:237-285, 1996.

Karlinsky, I., et al.; "The chains model for detecting parts by their context"; In CVPR, pp. 25-32, 2010.

Laptev, I., et al.; "Learning realistic human actions from movies":. In CVPR, Anchorage, AK, Jun. 2008.

Li, Y., et al.; "Learning shift in variant sparse representation of actions"; In CVPR, pp. 2630-2637, 2010.

Liu, J., et al.; "Recognizing realistic actions from videos in the wild"; In CVPR, Miami, FL, Jun. 2009.

Niebles, J.C., et al.; "Unsupervised learning of human action categories using spatial-temporal words"; IJCV, 79 (3):299-318, Mar. 2008.

Ning, H., et al.; "Discriminative learning of visual words for 3D human pose estimation"; In Proceedings of the IEEE Computer Society Conference on Computer Vision and Pattern Recognition, pp. 1-8, 2008.

Tian, T.P., et al.; "Fast globally optimal 2d human detection with loopy graph models"; In CVPR, pp. 81-88, 2010.

Turago, P., et al.; "Machine recognition of human activities: a survey"; IEEE Trans. on Circuits and Systems for Video Technology, 18(11):1473-1488, Nov. 2008.

Wang, F., et al.; "Video event detection using motion relativity and visual relatedness"; In ACM Multimedia, Vancouver, Canada, Oct. 2008.

Wang, J.M., et al,; "Gaussian process dynamical models for human motion";. IEEE Transactions on Pattern Analysis and Machine Intelligence, 30(2):283-298, 2008.

Wong, S.F ., et al.; "Learning motion categories using both semantic and structural information";. In CVPR, Minneapolis, MN, Jun. 2007.

Yao, B., et al.; "A structured image representation for recognizing human and object interactions"; In CVPR, pp. 9-16, 2010.

Yao, B., et al.; ". Modeling mutual context of object and human pose in human-object interaction activities"; In CVPR, pp. 17-24, 2010.

Amit, Y., et al.; "Graphical templates for model registration"; IEEE Trans. Pattern Analysis and Machine Intelligence, 18(3):225-236, Mar. 1996; Reprint p. 1-30.

Felzenszwalb, P.F., et al.; "Representation and detection of deformable shapes"; IEEE Trans. Pattern Analysis and Machine Intelligence, 27(2):208-220, Feb. 2005; Reprint p. 1-32.

* cited by examiner

| Action sequences | Models | | | |
|---|---|---|---|---|
| | Clap | Drink | Hammer | Kick |
| Clap | 1 | 3 | 4 | 2 |
| Drink | 3 | 1 | 4 | 2 |
| Hammer | 3 | 2 | 1 | 4 |
| Kick | 3 | 4 | 2 | 1 |

FIG. 9

ACTION-BASED MODELS TO IDENTIFY LEARNED TASKS

BACKGROUND OF THE INVENTION

The automatic recognition of human behavior by an automated device may be desirable in fields that utilize behavior recognition. Accordingly, it is often desirable to train an automated device to identify behaviors involving person centric articulated motions, such as picking up a cup, kicking a ball, and so forth. As such, a variety of methods have been developed that attempt to teach an automated device to recognize such actions. For example, in some methods, the automated device may participate in a "learning by example" process during which, for example, a labeled dataset of videos may be utilized to train the device to perform classifications based on discriminative or generative methods. However, a variety of other statistical approaches have been developed to train automated devices to recognize actions.

Unfortunately, these statistical approaches often fall short of achieving the desired recognition levels and are plagued by many weaknesses. For example, these methods may include drawbacks such as overlearning and ungraceful performance degradation when the automated device is confronted with novel circumstances. Further, these statistical methods may be unable to account for physical phenomena, such as gravity and inertia, or may poorly accommodate for such phenomena. Accordingly, there exists a need for improved systems and methods that address these drawbacks.

BRIEF DESCRIPTION OF THE INVENTION

In one embodiment, a system includes a learning environment and an agent. The learning environment includes an avatar and an object. A state signal corresponding to a state of the learning environment includes a location and orientation of the avatar and the object. The agent is adapted to receive the state signal, to issue an action capable of generating at least one change in the state of the learning environment, to produce a set of observations relevant to a task, to hypothesize a set of action models configured to explain the observations, and to vet the set of action models to identify a learned model for the task.

In another embodiment, a discovery learning method includes producing a set of observations corresponding to approximations of a desired action and hypothesizing a set of models capable of explaining the set of observations. The discovery learning method also includes vetting the hypothesized set of models to identify a learned model by testing the ability of the hypothesized set of models to assist in performing the desired action.

In another embodiment, a system includes a learning environment having an avatar and an object. A state signal corresponding to a state of the learning environment includes a location and orientation of the avatar and the object. Further, an agent is adapted to receive the state signal, to issue an action adapted to generate at least one change in the state of the learning environment, to produce a set of observations relevant to a task, to hypothesize a set of action models capable of explaining the observations, and to vet the set of action models to identify a learned model for the task.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 illustrates an embodiment of an example ranked consistency matrix generated for a plurality of action sequences and a plurality of models.

DETAILED DESCRIPTION OF THE INVENTION

As described in detail below, provided herein are methods and systems capable of directing an agent to learn to recognize an action by learning to execute the action. That is, presently disclosed embodiments are directed toward developing action recognition via a "learning by discovery" method. Accordingly, certain embodiments are directed toward an agent-based method for learning how to perform a variety of goal-oriented actions based on perceived imagery. As such, provided embodiments include development of internal representations or models of certain behaviors that the agent learns to first perform and subsequently recognize. To that end, in certain embodiments, methods are provided that enable the agent to gather observations regarding a desired action, to generate hypothetical models capable of explaining these observations, and to make predictions capable of being validated with new experiments.

Figure 1:
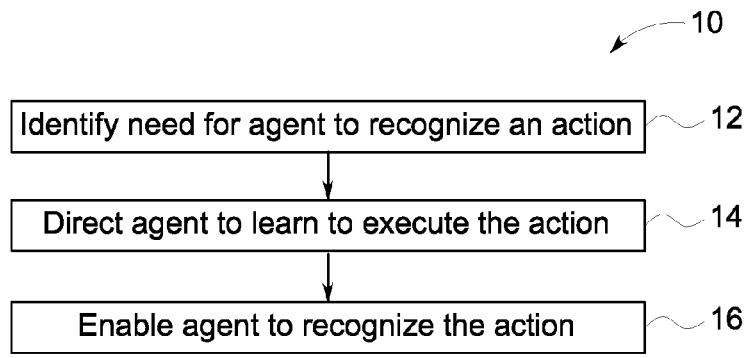
FIG. 1 illustrates an embodiment of a "learning by discovery" method that may be employed by a controller to enable an agent to recognize an action.

Turning now to the drawings, FIG. 1 illustrates an embodiment of a "learning by discovery" method 10 that may be employed by a suitable controller. The method 10 includes identification of a need for an agent to recognize an action (block 12). For instance, it may be desirable for the agent to be able to recognize certain goal-oriented actions, such as a person picking up a cup or kicking a ball. Further, the method 10 includes directing the agent to learn to execute the action (block 14) and enabling the agent to recognize the action (block 16). That is, by first training the agent to perform an action, the agent may then learn to recognize the action.

Figure 2:
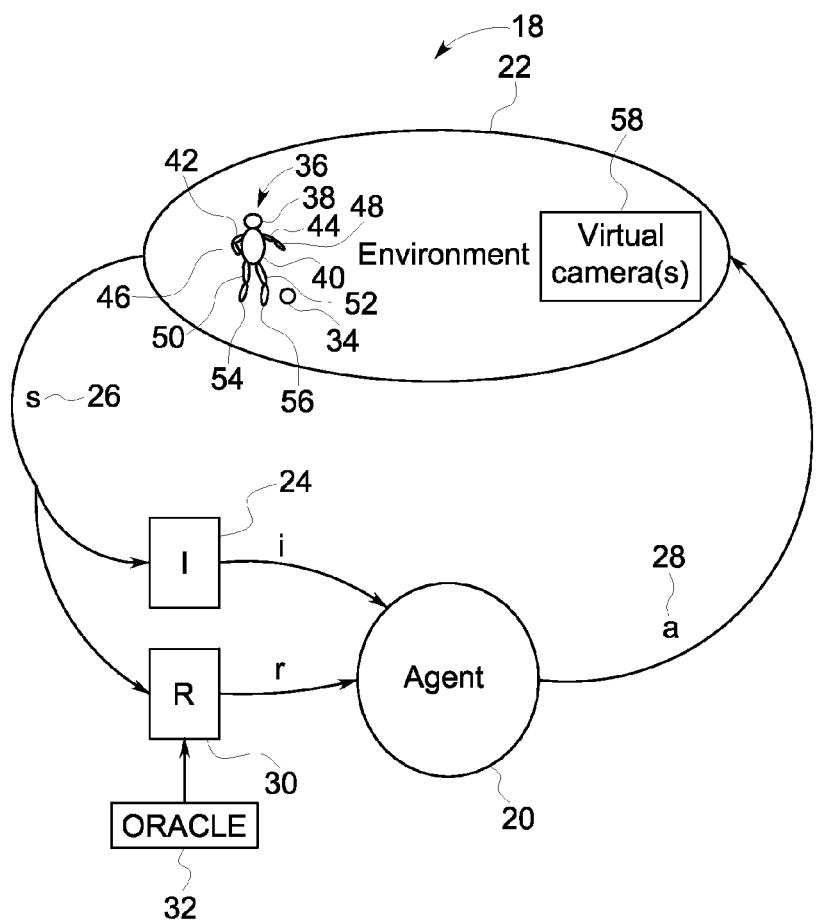
FIG. 2 illustrates an embodiment of a system having a reinforcement learning framework that supports the "learning by discovery" method of FIG. 1.

The method 10 of FIG. 1 may be better understood by considering a system 18 of FIG. 2 that illustrates an embodiment of a reinforcement learning framework that supports the "learn by discovery" method 10. As shown, the system 18 includes an agent 20 that is connected to a learning environment 22 via perception and action. In the embodiment illustrated herein, the learning environment 22 is based on a simulated three dimensional world populated with various objects 34 of interest and an articulated three dimensional avatar 36. The avatar 36 has a set of connected body parts including a head 38, a torso 40, two upper arms 42 and 44, two lower arms 46 and 48, two upper legs 50 and 52, and two lower legs 54 and 56. The learning environment 22 state (s) 26 consists of the location and orientation of all three dimensional objects, the avatar 36 body parts and their associated joint angles. The agent 20 may control the avatar 36 by issuing adjustment instructions for specific joint angles in terms of positive or negative increments. The learning environment 22 combines these agent actions with additive noise resulting in adjustments to the articulation of the avatar 36. Further, an input (i) 24 is a set of synthetic images of the three dimensional world that are produced by a set of virtual cameras 58. It should be noted that in order to control the avatar 36, the agent 20 may need to employ a form of depth perception, and in one embodiment, this depth perception may be achieved by ensuring that the set of synthetic images is no less than two.

As the agent 20 interacts with the learning environment 22, it receives the input (i) 24 that is an indication of the current state 26 of the learning environment 22. The agent 20 issues an action (a) 28, which causes a change in the state 26. The agent 20 then receives an updated input 24 as well as a scalar reinforcement signal (r) 30 that indicates the value associated with the recent state transition. The reinforcement signal 30 is generated by an oracle 32 that possesses a fundamental understanding of the task at hand and has direct access to the state 26. During operation of the system 18, the goal of the agent 20 is to construct a policy that enables the choice of actions that result in increased long-term reinforcement values 30. If the agent 20 is able to reliably perform the desired task using this policy, then the agent 20 has learned the task via discovery.

It should be noted that a variety of learning by discovery methods may be employed to teach the agent 20 to recognize a task by first teaching the agent 20 to learn the task. Indeed, many implementation-specific variations of the described methods and systems are within the scope of presently disclosed embodiments. In one embodiment, however, the learning process may include three distinct steps shown in method 60 of FIG. 3. In the illustrated method 60, the agent 20 first produces a set of observations representing approximations of a desired action (block 62). For example, in one embodiment, the agent begins by implementing a policy that directly follows the reinforcement signal 30 to produce a set of initial observations representing crude approximations of the desired action. The method 60 proceeds with the agent 20 hypothesizing a set of simple Internal Action Models (IAMs) that are capable of explaining these observations (block 64). The IAMs are a set of potential policies that the agent 20 may use to attempt to perform the desired action (e.g., kicking a ball, picking up a cup, etc.). Still further, the method 60 includes vetting the candidate IAMs based on their ability to assist in performing the desired actions under a variety of operating conditions (block 66).

As briefly discussed above, the learning environment 22 in certain embodiments is based on a simulated three dimensional world populated with various objects of interest 34 and the avatar 36. The agent 20 may control the avatar 36 by issuing adjustment instructions for specific joint angles in terms of positive or negative increments. The environment 22 combines these agent-actions with additive noise resulting in adjustments to the articulation of the avatar 36.

In one embodiment, each object 34 and body part (e.g., head 38, torso 40, etc.) is represented by an ellipsoid which can be defined by:

$$X^T Q X = 0; \quad (1)$$

in which X are the homogeneous three dimensional coordinates of a point in space and Q is a 4×4 matrix. Given a projective camera matrix P, each ellipsoid can be projected on to the image plane forming an ellipse defined by:

$$u^T C u = 0; \quad (2)$$

where u is homogeneous point in the image plane and C is a 3×3 matrix. The input images to the agent 20, which are indicative of the learning environment state 26, are computed via this projection process using the virtual cameras 58.

Figure 4:
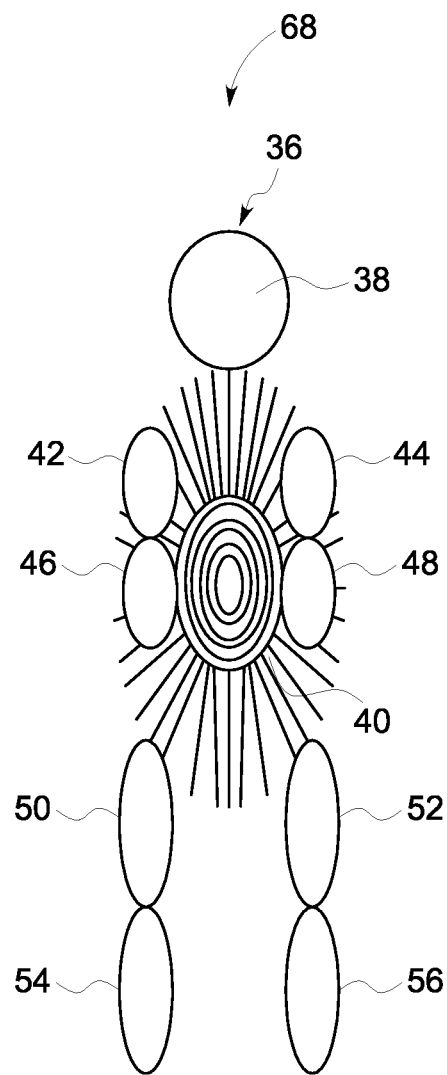
FIG. 4 illustrates an example of an image indicative of one example learning environment state that may be input to an agent in accordance with an embodiment.

FIG. 4 illustrates an example of an image 68 that may be input to the agent 20 and is indicative of one example learning environment state 26. As shown in the image 68, the avatar 36 is articulated to illustrate its current state in the environment 22. As shown, the articulated avatar 36 is defined by the position of the standard tree-like limb structure composed of connected ellipsoids associated with the head 38, the torso 40, the upper arms 42 and 44, the lower arms 46 and 48, the upper legs 50 and 52, and the lower legs 54 and 56. In one embodiment, the three dimensional pose of the avatar 36 is defined by the three dimensional joint angles between connected body parts. During operation, the agent 20 controls the avatar 36 by issuing actions of the form $(x, x_i)$, where x refers to a specific joint angle and $x_i$ defines a positive or negative increment. Each body part inherits the coordinate system of its parent part. If, for example, the angle connecting the upper leg 50 or 52 to the torso 40 is changed, the entire leg will rotate accordingly.

Further, during operation, the oracle 32 provides reinforcement to the agent 20 by considering a script that orchestrates changes in the body-part to body-part and body-part to object spatial relationships. For example, the grasping of a cup would receive reinforcement that is inversely proportional to the three dimensional distance between the end of one of the lower arms 46 or 48 and the object 34, which represents a cup in this embodiment. In addition, the learning environment 22 will also provide negative feedback in the event that the avatar 36 attempts to perform an unnatural act, such as the hyperextension of a joint or entering into an unstable configuration with respect to gravity or physical occupancy.

Figure 3:
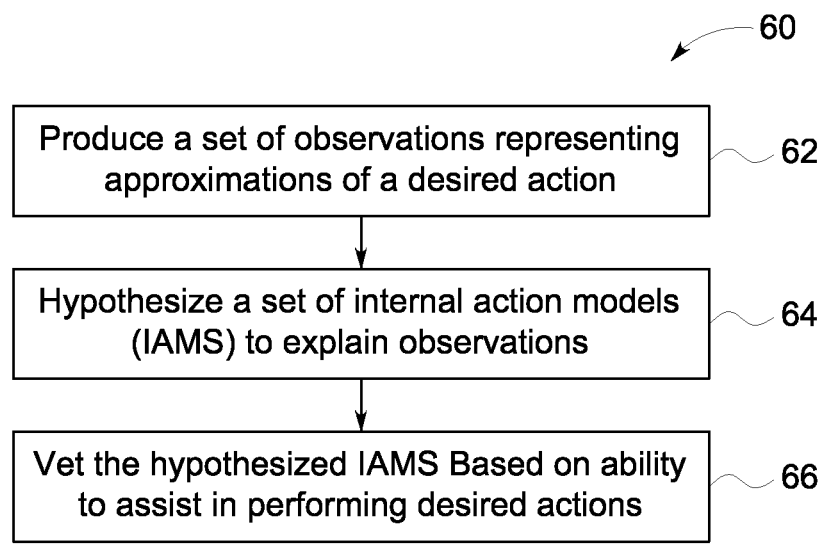
FIG. 3 illustrates an embodiment of a learning paradigm method that may be implemented by an agent.

In the following discussion, the steps 62, 64, and 66, which were introduced above with respect to FIG. 3, will be described in more detail. That is, the three steps 62, 64, and 66 that the agent 20 takes when learning an IAM will be described. Particularly, the agent 20 produces a set of initial observations representing crude approximations of the desired action (block 62), hypothesizes a set of IAMs (block 64), and vets the IAMs based on their ability to reliably assist in performing the desired action under a variety of operating conditions (block 66).

In one embodiment, to start the learning process, the agent 20 needs to gather an initial set of observations of the desired task (block 62). However, given that no prior knowledge is available regarding the task at hand, in this embodiment, the agent 20 simply follows the guidance provided by the oracle 32. More specifically, the learning environment 22 is first initialized into a random start position and then at each step of the interaction, the agent 20 sequentially probes the environment 22 with all possible actions and selects the action that receives the largest reinforcement signal 30 with the condition that it not receive any negative feedback. The agent 20 is therefore able to build a set of input image sequences with increasing reinforcement signals 30 that are indicative of the intended task. In this embodiment, given these initial observations, the agent 20 then hypothesizes an IAM that can be used to ultimately replace the reinforcement signal 30 provided by the oracle 32. Once such an IAM based policy has been constructed, the agent 20 may execute the task in an autonomous fashion.

In one embodiment, the model discovery process employed by the agent 20 may include the agent 20 developing an internal representation of the task at hand. To that end, a useful class of IAMs must be developed. In one embodiment, the sequence of springs model may be utilized to develop the IAMs. However, it should be noted that any form of modeling may be employed in other embodiments. In this embodiment, however, given an input image set 24, a measurement vector is extracted. Let $Vr=(Vr1, \ldots, Vr_N)$ be a sequence of such measurement vectors. Given two consecutive measurement vectors, $Vr_k, Vr_{k+1}$, an IAM provides a response based on the response function:

$$rf(Vr_k, Vr_{k+1}). \tag{3}$$

If this function is similar to the reinforcement 30 provided by the oracle 32, then the agent 20 may choose its actions based on rf( ) in the previously described manner.

In one embodiment, the form of the IAM is based on a sequence of T entities $(SN_1, SN_2, \ldots, SN_T)$ known as spring nodes (SNs). At any given time only one spring node in the model is active. When the active spring node is deactivated, the next spring node in the sequence is activated. Once the last spring node is deactivated, the IAM is no longer active. When the IAM is initialized, the first spring node is activated.

In this embodiment, each spring node is focused on only a single element in the measurement vector as indicated by the index "in." Its goal is to provide a response that drives this measurement down to a target value from above or up to a target value from below. Once this objective has been achieved, the spring node is deactivated. The $j^{th}$ spring node maintains its own response function of the form:

$$rf_j(Vr_k, Vr_{k+1}) = \alpha*(Vr^{in}_{k+1} - Vr^{in}_k); \tag{4}$$

where $\alpha$ is set to 1 if the spring node is attempting to increase the measurement $Vr^{in}_k$ or −1 if it is trying to decrease that parameter. Thus, the IAM response function can be defined as:

$$rf(Vr_k, Vr_{k+1}) = \sum_{j}^{T} rf_j\left(V_{\underset{k}{r}}, V_{\underset{k+1}{r}}\right)\delta(j); \tag{5}$$

where $\delta(j)$ is 1 if the $j^{th}$ spring node is active and zero otherwise.

Figure 5:
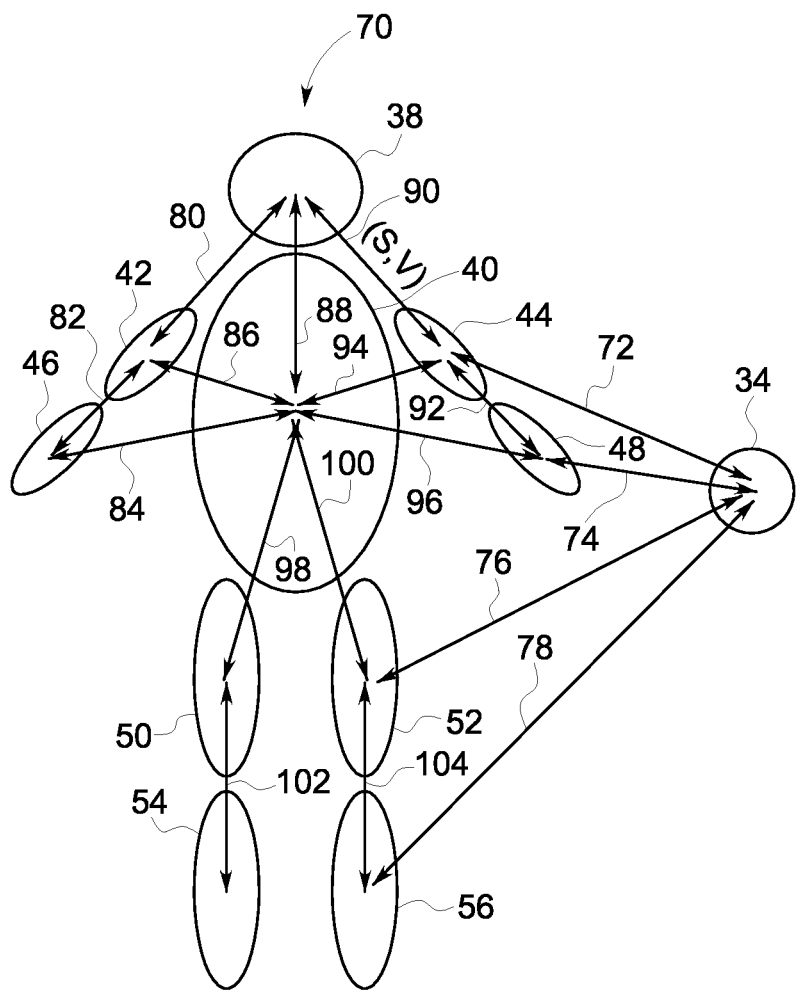
FIG. 5 is a diagram of an embodiment of an avatar illustrating examples of measurements that may be extracted from input imagery in accordance with an embodiment.

In the described embodiment, it is assumed that each body part and object has an associated interest point that can be located in every input image. The distance between any two interest points in this embodiment is the minimum of the euclidean distances as measured in any of the current set of input images. The measurement vector $V_r$ is then defined as the set of all such pairwise distance measures. For example, FIG. 5 is a diagram 70 illustrating examples of measurements that may be extracted from input imagery. As shown, distance measurements represented by arrows 72, 74, 76, and 78 show the distances from the object 34 to the upper arm 44, the lower arm 48, the upper leg 52, and the lower leg 56, respectively. It should be noted that in some embodiments, a distance measurement may be established from the object 34 to each of the avatar body parts, not limited to the measurements shown. Further, arrows 80, 82, 84, 86, 88, 90, 92, 94, 96, 98, 100, 102, and 104 each represent a distance measure between two body parts of the avatar 36. However, here again, in certain implementations, a measurement may be established between each pair of body parts.

It should be noted that since connectivity between body parts is enforced, each spring node may have a global effect on the avatar 36. Note that when there are more than one virtual camera 58 views, this process may operate over three dimensional distance measures. However, in embodiments in which only a single view is available, only two dimensional distance measures may be considered. From the recognition perspective, a set of observations $V_r$ may be characterized by either being consistent or inconsistent with the IAM. This measure of consistency can be defined as:

$$C(V_r) = \sum_{k}^{N-1} rf_j(Vr_k, Vr_{k+1}). \tag{6}$$

This consistency function, which is the sum of the IAM response functions, may be used to classify image sequences and to nominate potential IAMs in some embodiments, as described in more detail below.

Figure 6:
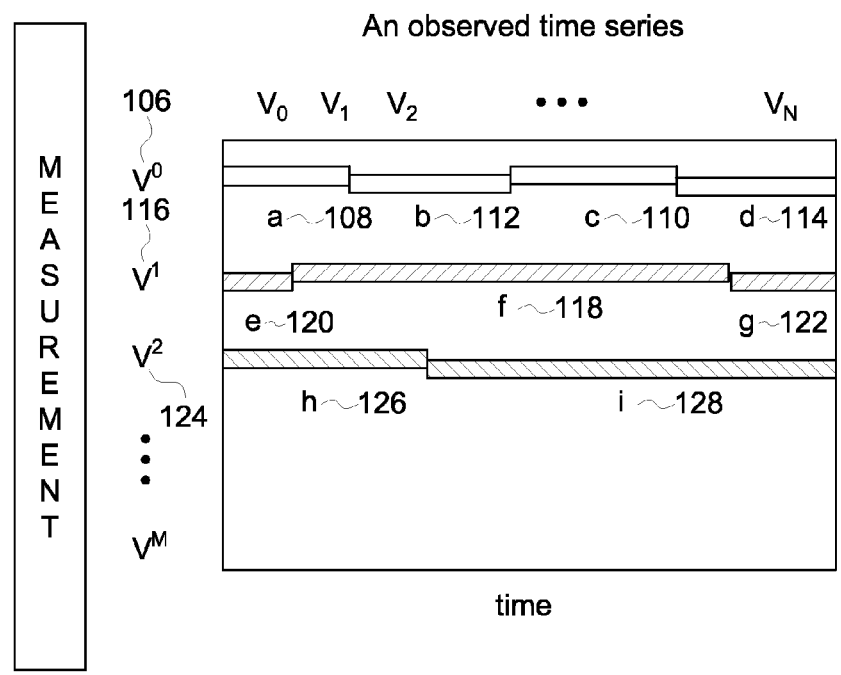
FIG. 6 is a diagram illustrating a set of example measurement sequences that are indicative of the target task and may be generated by following reinforcement provided by an oracle in accordance with an embodiment.

Turning now to IAM nomination, as mentioned above, a set of example measurement sequences that are indicative of the target task can be generated by following the reinforcement 30 of the oracle 32. An example of such a measurement sequence is shown in FIG. 6. As shown, for a first measurement 106, there are periods of increasing value 108 and 110 as well as periods of decreasing value 112 and 114. Similarly, for a second measurement 116, there is a period of increasing value 118 as well as periods of decreasing value 120 and 122. Likewise, for a third measurement 124, there is a period of increasing value 126 and a period of decreasing value 128. Therefore, as shown in the illustrated embodiment, each specific measurement alternates between periods of increasing and decreasing value. Each such period can be used to specify the target value, an $\alpha$ value and an index, which can be used to specify a potential spring node.

Figure 7:
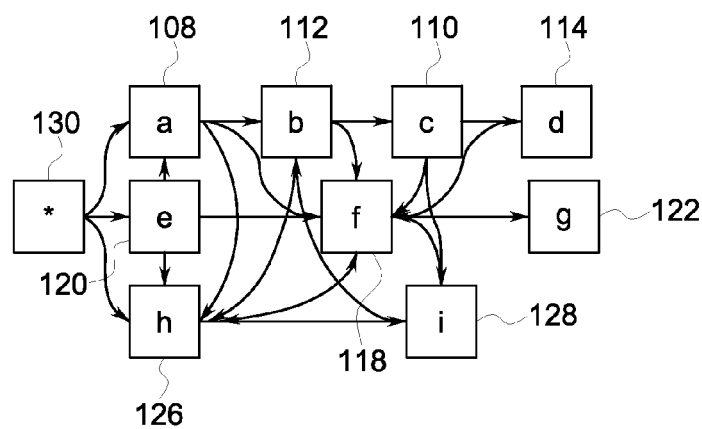
FIG. 7 is a graphical representation of potential connectivity between a root and a plurality of spring nodes in accordance with an embodiment.

In some embodiments, any given spring node could transition onto any other spring node as long as there is temporal overlap between them and the second spring node outlives the first. Therefore, a directed graph of connected spring nodes can be constructed for a given measurement sequence. A graphical representation of potential connectivity from a root 130 and between spring nodes is shown in FIG. 7. Any path through this graph along the illustrated arrows that starts from the root 130 and ends at a terminal spring node (e.g., spring nodes d and g) constitutes a valid IAM that is capable of explaining the observed behavior of the example sequence.

In embodiments in which the enumeration of all such paths is numerically unlikely or infeasible, the most likely IAMs may be identified by employing an algorithm known to those skilled in the art and with the heuristic that the integral of the observed measurement variations that can be directly attributed to the IAM is a good measure of the quality of the IAM. In this way, each example sequence may nominate a set of IAMs. While each nominated IAM may be consistent with its example sequence, it may not be consistent with the rest of the example sequences. Therefore, a merit score may be determined for each nominated IAM based on the sum of its consistency scores (e.g., the scores computed using equation 6) for the set of example sequences. In certain embodiments, this process may be utilized to determine top scoring IAMs that proceed to the vetting step (block 66 of FIG. 3).

Figure 8:
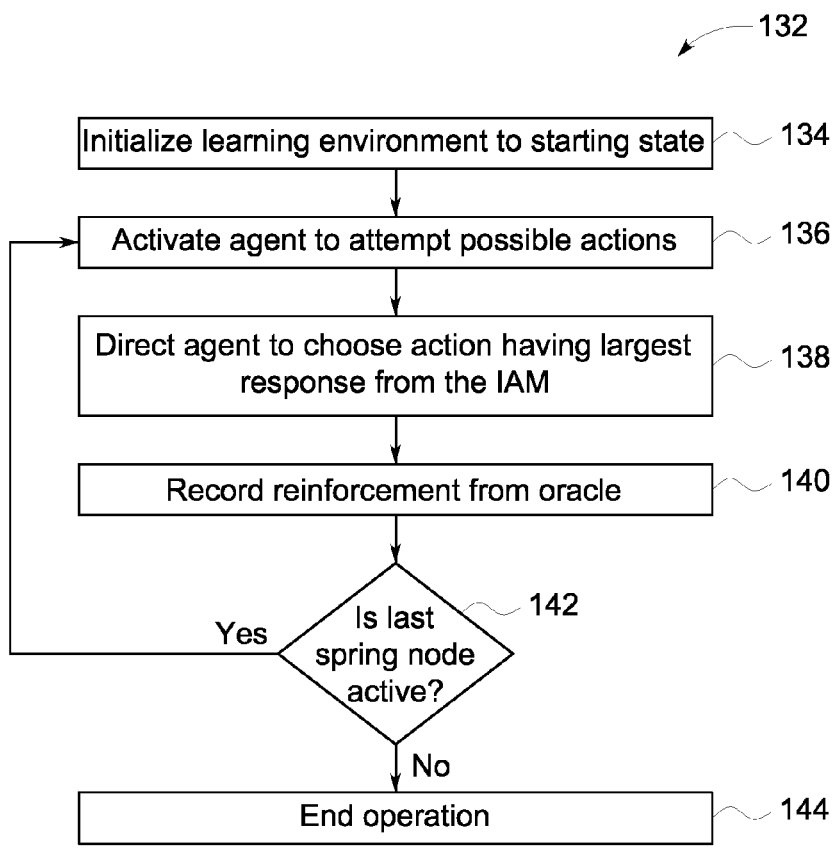
FIG. 8 illustrates an embodiment of a method that may be implemented to test one or more Internal Action Models (IAMs)

Turning now to the IAM vetting, it should be noted that while a given IAM may be consistent with all of the example sequences based on its consistency measure computed via equation 6, it may still be a poor candidate for use in driving the avatar 36. For example, while making pancakes, a person would likely keep their feet on the ground. However, keeping your feet on the ground is not a good instruction set for making pancakes. Therefore, an IAM may also need to be tested based on its ability to assist in performing the desired action in the learning environment 22. An example of one method 132 that may be implemented to test the IAMs is shown in FIG. 8.

Specifically, the testing process 132 includes initializing the learning environment 22 to a random starting state for each candidate IAM (block 134). Subsequently, the agent 20 attempts each possible action (block 136) and chooses the action that receives that largest response from the IAM (block 138). The reinforcement 30 provided by the oracle 32 is recorded for each performed action (block 140). The method 132 then proceeds by inquiring as to whether or not the last spring node is active (block 142). If the last spring node is still active, the process 132 is repeated until the last spring node in the IAM is no longer active, and the operation is ended (block 144). This process is repeated a desired number of times so as to expose the IAM to a wide variety of operating conditions. In some embodiments, the sum of the recorded reinforcement received from the oracle 32 is used as a measure of the success of the IAM. Finally, the most successful IAM is selected as the learned model for the given task (e.g., kicking a ball, holding a cup, etc.).

It should be noted that in certain instances, it may be desirable to be able to identify the image coordinates of various objects of interest as well as the critical body parts of the entity performing the task. Further, in certain embodiments, a goal may be to not only perform tasks in the learning environment 22, but to also analyze real-world imagery and, thus the image representation may need to be supported in both domains. To that end, in certain embodiments, it may be desirable to rely on the outputs that can be produced by generic object detectors such as object bounding boxes.

It should be noted that in terms of body part specification, there are a number of possibilities known to those skilled in the art that may be employed, including code-book based pose regression methods, the detection of body parts based on salient anchor points such as the head, the use of pictorial structures, methods based on the fitting of tree based triangulated graphs, and so forth. In one embodiment, the triangulated graphs approach may be utilized. In this embodiment, for each input image, the agent 20 will receive an oriented bounding box for each body part and each object of interest. For images produced by the learned environment 22, these features may be produced by considering the C matrices in equation 2 used to construct the ellipses for each input image. For real-world imagery, the output of automatic algorithms may be utilized to obtain these bounding boxes. Here again, the measurement vector may be defined by concatenating the minimum distance between the x and y coordinates of the centers of every pair of bounding boxes across the current set of input images.

The foregoing methods and systems may be employed to teach the agent 20 to recognize a variety of goal-oriented tasks, such as kicking, drinking, hammering and clapping. In an embodiment in which these are the four learned tasks, in addition to the avatar 36, the learning environment 22 contains a ball, a cup and a nail that are randomly placed in the scene. In such an embodiment, the oracle 32 may provide reinforcement based on criteria associated with the given action. For example, the oracle's criteria may be minimizing the distance between the right foot and the ball for a kicking action; minimizing the distance between the right hand and the cup followed by minimizing the distance between the right hand and the head for a drinking action; minimizing the distance between the right hand and a point above the nail followed by minimizing the distance between the right hand and the nail for a hammering action; and minimizing the distance between the two hands followed by maximizing the distance between the two hands for a clapping action.

For each task, sample sequences may be collected by directly following the reinforcement signal 30 provided by of the oracle 32. As previously described, for each example sequence, a collection of IAMs are nominated by considering possible end-to-end paths contained in the associated spring node graphs. An appropriate algorithm may then be used to nominate initial IAMs. These nominated IAMs are then ranked based on their ability to recognize the remaining sequences by using equation 6. The top models may then be passed on to the last stage of analysis during which each remaining candidate model provides guidance to the agent 20 inside the learning environment 22. The performance of each IAM is then judged based on the resulting reinforcement signals 30 that are produced by the oracle 32. The IAM that is able to best mimic the oracle's performance is selected as the final action model.

Figure 9:
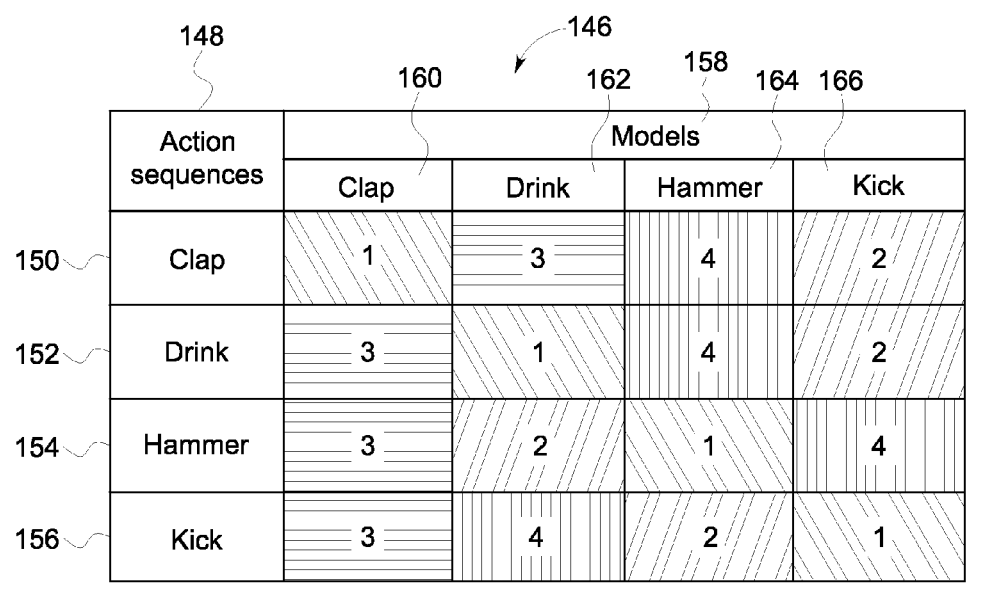

Subsequently, after action models have been generated for each of the desired tasks (e.g., kicking, drinking, hammering, and clapping), the ability to recognize new instances of these tasks may be tested by synthesizing a new sequence for each task. The recognition responses, which may be acquired via equation 6, for each sequence with respect to the four action models may then be ranked. A ranked consistency matrix, such as an example ranked matrix 146 shown in FIG. 9, may then be generated. As shown in FIG. 9, action sequences 148 including clapping 150, drinking 152, hammering 154, and kicking 156 are provided. Learned action models 158 include a clapping model 160, a drinking model 162, a hammering model 164, and a kicking model 166. As shown in FIG. 9, the clapping action sequence 150 is most consistent with the clapping model 160, the drinking action sequence 152 is most consistent with the drinking model 162, the hammering action sequence 154 is most consistent with the hammering model 164, and the kicking action sequence 156 is most consistent with the kicking model 166. It should be noted that a similar consistency matrix may be developed for real world imagery as well as simulated imagery. Indeed, the foregoing methods and systems are equally applicable to real world and simulated instances.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a three dimensional learning environment comprising an avatar and an object, and a state signal corresponding to a state of the learning environment comprising a location and orientation of the avatar and the object, wherein the object is a camera that produces a set of synthetic images of the three dimensional learning environment and wherein the avatar comprises articulated body parts, such that a processor computes and defines coordinates of each body part of the avatar;

an agent that receives the state signal via the set of synthetic images and issues adjustment instructions that employ depth perception to generate at least one change in the state of the learning environment;

an oracle that generates a reinforcement signal in response to the change in the state of the learning environment and communicates the reinforcement signal to the agent by considering a computer script that orchestrates changes in body-part to body-part and body-part to object spatial relationships with respect to gravity, inertia, and physical occupancy, wherein the agent utilizes the reinforcement signal to produce a set of observations relevant to a task, hypothesizes a set of Internal Action Models configured to explain the observations, and vets the set of Internal Action Models to identify a learned model for the task such that a sum of the reinforcement signals received from the oracle selects the Internal Action Model for the task;

wherein the agent builds a set of input image sequences with increasing reinforcement signals that are indicative of the task; and wherein the agent executes the task autonomously to perform a variety of goal-oriented actions based on real-world imagery.

2. The system of claim 1, wherein the avatar comprises a plurality of ellipsoids coupled together by a plurality of joint angles.

3. The system of claim 2, wherein the action issued by the agent comprises a signal corresponding to one of the plurality of joint angles and a negative or positive increment for the one joint angle.

4. The system of claim 1, wherein hypothesizing the set of Internal Action Models comprises implementing a sequence of springs model.

5. The system of claim 1, wherein the agent utilizes the learned model to recognize the task when performed by an external agent.

6. The system of claim 1, wherein vetting the set of Internal Action Models comprises initializing the learning environment to a starting state, attempting a plurality of possible actions, identifying an action of the plurality of actions corresponding to a positive response from an identified Internal Action Model of the set of Internal Action Models, and recording reinforcement signals from the oracle corresponding to each action.

7. The system of claim 1, comprises one or more virtual camera generates one or more images of the avatar received by the agent as part of the state signal.

8. The system of claim 1, wherein the agent reduces the set of hypothesized Internal Action Models by computing a consistency function and vets the reduced set of hypothesized Internal Action Models.

* * * * *